US005187373A

United States Patent [19]

Gregori

[11] Patent Number: 5,187,373

[45] Date of Patent: Feb. 16, 1993

[54] EMITTER ASSEMBLY FOR USE IN AN OPTICAL TRAFFIC PREEMPTION SYSTEM

[75] Inventor: George A. Gregori, New Brighton, Minn.

[73] Assignee: Minnesota Mining and Manufacturing Company, St. Paul, Minn.

[21] Appl. No.: 756,321

[22] Filed: Sep. 6, 1991

[51] Int. Cl.[5] .......... G02B 27/00

[52] U.S. Cl. .......... 250/551; 340/906

[58] Field of Search .......... 250/551; 340/471, 472, 340/906, 907; 359/354-356, 127, 129, 130, 131, 641

[56] References Cited

U.S. PATENT DOCUMENTS

| | | | |
|---|---|---|---|
| Re. 28,100 | 8/1974 | Long | 340/34 |
| 3,739,179 | 6/1973 | Krekow | 250/216 |
| 4,162,477 | 7/1979 | Munkberg | 340/906 |
| 4,223,295 | 9/1980 | Bonner et al. | 340/906 |
| 4,234,967 | 11/1980 | Henschel | 340/906 |
| 4,240,063 | 12/1980 | Gould et al. | 340/119 |
| 4,435,696 | 3/1984 | Gould et al. | 340/119 |
| 4,662,726 | 5/1987 | Rines et al. | 359/641 |
| 4,704,610 | 11/1987 | Smith et al. | 340/906 |
| 4,942,503 | 7/1990 | Lyons | 362/74 |

OTHER PUBLICATIONS

PB91-168039, "Traffic Signal Control Equipment: State of the Art," prepared by American Association of State Highway and Transportation Officials, Washington, D.C., Dec. 1990, pp. 13-15.

Opticom TM Priority Control System Brochure, "Model 192 Specifications," Safety and Security Systems Division/3M "Lightbar Emitter Model 3M9000 Series," Traffic Control Systems Opticom TM Priority Control System Brochure.

"Z-Crate Visor Model 4102," Indicator Controls Corp. Brochure, Rancho Dominguez, Calif. 90221.

*Primary Examiner*—David C. Nelms
*Assistant Examiner*—S. Allen
*Attorney, Agent, or Firm*—Gary L. Griswold; Walter N. Kirn; William B. Barte

[57] ABSTRACT

An optical signal emitter assembly emits light pulses which are received by an optical traffic preemption system detector. The optical signal emitter assembly employs a honeycomb element positioned in front of a light source which collimates light emitted by the optical signal emitter assembly. The optical signal emitter assembly is convertible from a stand-alone unit containing power supply circuitry, timing circuitry, and a light source in a single housing, to a unit wherein the light source can be mounted independently from a housing containing the power supply circuitry and the timing circuitry.

21 Claims, 6 Drawing Sheets

EMITTER ASSEMBLY FOR USE IN AN OPTICAL TRAFFIC PREEMPTION SYSTEM

BACKGROUND OF THE INVENTION

This invention relates to a system that allows authorized vehicles to remotely control traffic signals, and more specifically, to an optical signal emitter assembly for use in such a system, wherein an optical signal emitter assembly attached to an approaching authorized vehicle transmits a stream of light pulses to a detector mounted near a traffic intersection causing a preemption request to be issued to a traffic signal controller.

Traffic signals have long been used to regulate the flow of traffic at intersections. Generally, traffic signals have relied on timers or vehicle sensors to determine when to change traffic signal lights, thereby signaling alternating directions of traffic to stop, and others to proceed.

Emergency vehicles, such as police cars, fire trucks and ambulances, generally have the right to cross an intersection against a traffic signal. Emergency vehicles have typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning originating from an approaching emergency vehicle. This can create a dangerous situation when an emergency vehicle seeks to cross an intersection against a traffic signal and the driver of another vehicle approaching the intersection is not aware of the warning being transmitted by the emergency vehicle.

This problem was first successfully addressed in U.S. Pat. No. 3,550,078 (Long), which is assigned to the same assignee as the present application. The Long patent discloses an emergency vehicle with an optical emitter, a plurality of detectors mounted along an intersection with each detector looking down an approach to the intersection, a plurality of signal processing circuits located in the detectors which produce a signal representative of the distance of the approaching emergency vehicle, and a phase selector which processes the signal from the processing circuits and can issue a request to a traffic signal controller to preempt a normal traffic signal sequence and provide green lights to the approaching emergency vehicle.

The Long patent discloses that as an emergency vehicle approaches an intersection, it emits a stream of light pulses at a predetermined rate, such as 10 pulses per second, and with each pulse having a duration of several microseconds. A detector receives the light pulses emitted by the approaching emergency vehicle. An output of the detector is processed by the phase selector, which then issues a request to a traffic signal controller to change to or hold green the traffic signal lights that control the emergency vehicle's approach to the intersection.

SUMMARY OF THE INVENTION

This invention provides an optical signal emitter assembly for remote control use in an optical traffic preemption system. The invention comprises a housing, a light source for emitting light pulses, a power supply for converting a supply voltage into a power signal capable of activating the light source, and timing circuitry coupled to both the light source and the power supply, for controlling the repetition rate and duration of the light pulse. Also, a light collimating honeycomb element is positioned in front of the light source to collimate the light pulses, resulting in an optical signal which provides improved control of the traffic lights to be controlled. The optical emitter of the present invention is less likely to inadvertently activate an optical traffic preemption system detector channel proximate to the traffic signal lights to be controlled, but coupled to traffic signal lights which are not to be controlled.

The invention is convertible from a stand-alone unit containing power supply circuitry, timing circuitry, and the light source in a single housing, to a unit wherein the light source can be mounted independently from a housing containing the power supply circuitry and the timing circuitry.

DETAILED DESCRIPTION OF THE PREFERRED EMBODIMENTS

Figure 1:
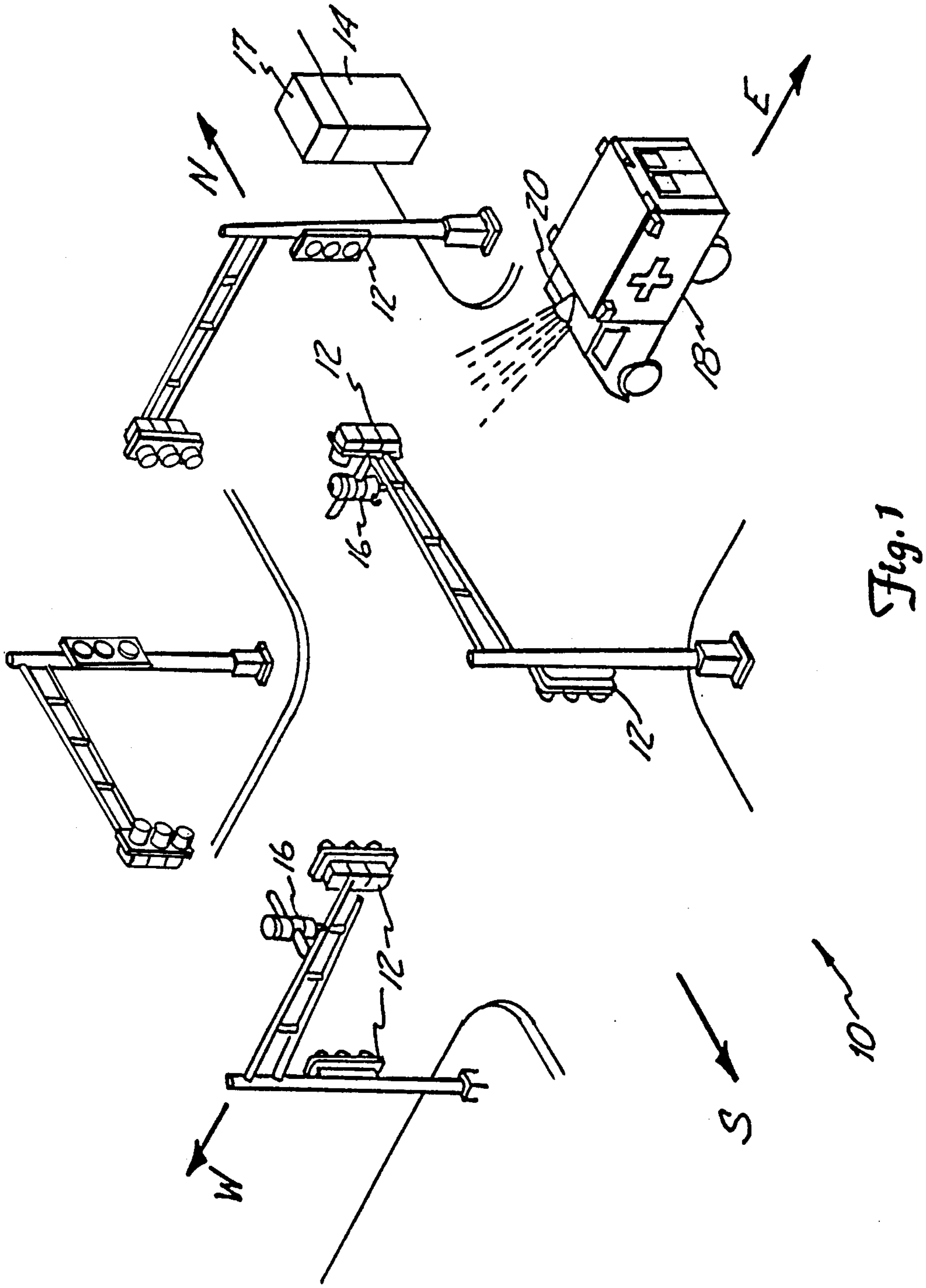
FIG. 1 is a perspective view of an intersection equipped with a traffic signal control system in which the optical emitter assembly of the present invention is mounted on an authorized vehicle approaching a typical traffic intersection.

FIG. 1 is an illustration of a typical intersection 10 with traffic signal lights 12. A traffic signal controller 14 sequences the traffic signal lights 12 to allow traffic to proceed alternately through the intersection. Of particular relevance to the present invention, the intersection is equipped with an optical traffic preemption system such as the Opticom TM Priority Control System manufactured by the Minnesota Mining and Manufacturing Company of Saint Paul, Minn. Such a system includes detector assemblies 16 stationed to detect light pulses from optical emitter assemblies, one of which (20) is mounted on an authorized emergency vehicle 18, which is shown approaching the intersection 10 from a westbound direction. The detector assemblies 16 communicate with a phase selector 17, which is typically located in the same cabinet as the traffic controller 14.

The optical emitter assembly 20 transmits light pulses at a predetermined duration and repetition rate. The detector assembly 16 receives these light pulses and sends an output signal to the phase selector 17, which processes the signal and issues a request to the traffic signal controller 14 to preempt a normal traffic signal sequence. If the optical emitter assembly 20 emits light pulses at the predetermined repetition rate, with each pulse having sufficient intensity and fast enough rise time, the phase selector 17 will request the traffic signal controller 14 to cause the traffic signal lights 12 controlling the north, south and east bound directions to become or remain red and the traffic signal lights controlling the westbound direction to become or remain green.

The present invention makes several improvements over optical emitters of the prior art. The optical emitter assembly of the present invention is provided with a honeycomb element which collimates the emitted light into a generally non-divergent beam. A non-divergent beam is desirable because it can prevent an authorized vehicle from activating an optical traffic preemption system proximate to, but not coupled with the traffic signal lights to be controlled.

Different embodiments of the honeycomb element can be employed. In one embodiment, the honeycomb element can have surfaces formed from a material which reflects light. In this embodiment, the honeycomb element tends to scatter light at close ranges, while having a collimating effect at longer ranges. This allows the emitter assembly to have a wide activation area when it is close to an optical traffic preemption system detector, yet have a narrow activation area when it is not close to a detector.

In another embodiment, surfaces of the honeycomb element can be formed from a material which absorbs light, thereby preventing a scattering effect. In this embodiment, the honeycomb element only collimates the emitted light into a generally non-divergent beam.

The present invention also provides more installation options than optical emitter assemblies of the prior art. The present invention is convertible from a stand-alone unit that has the power supply, timing circuitry and light source in the same housing into a two-piece unit having the power supply and timing circuitry within one housing and the light source, reflector, honeycomb element and lens within another housing. This allows a single design to be adapted to a wide variety of applications by allowing a user to purchase a simple kit, thereby reducing manufacturing costs and providing more flexibility to the user.

Figure 2:
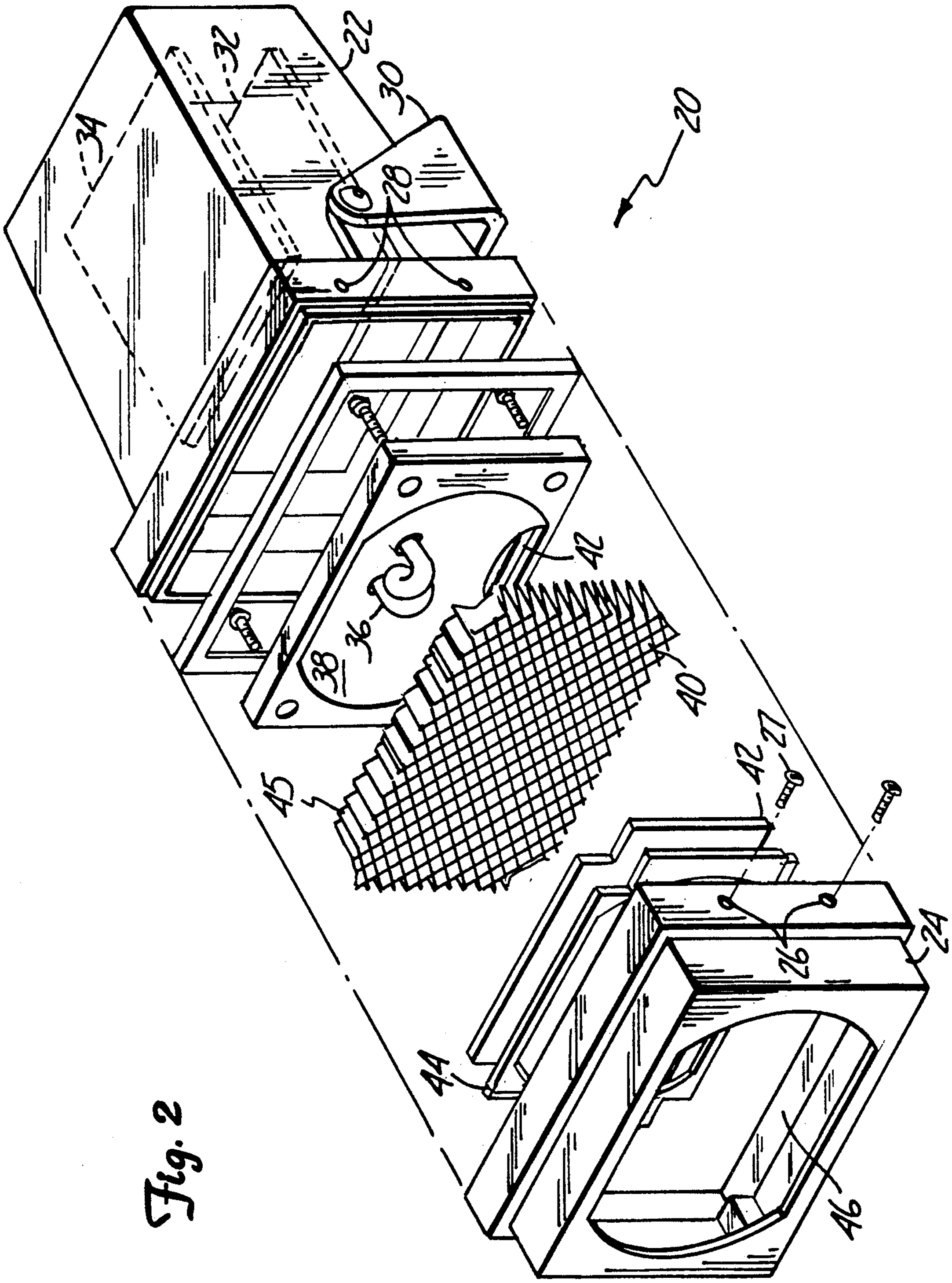
FIG. 2 is an exploded view of the optical emitter assembly of FIG. 1.

FIG. 2 is an exploded view of the optical emitter assembly 20 of FIG. 1. The optical emitter assembly 20 has a housing 22 and a front bezel 24. The front bezel 24 can be joined with the housing 22 by placing the front bezel 24 over the housing 22 and inserting fasteners 27 through the holes 26 to the threaded holes 28. A gasket 45 seals the interface between the housing 22 and the front bezel 24.

The housing 22 has a bracket 30, a power supply board 32 and a timing board 34. The bracket 30 is used to mount the optical emitter assembly 20 to a vehicle. The power supply board 32 receives a power supply voltage from the vehicle's power supply and converts the power supply voltage into a power signal, which is modulated by signals from the timing board 34 to cause a gaseous discharge lamp 36 to produce a stream of light pulses.

The lamp 36 is positioned within a reflector 38 that directs light through a honeycomb element 40. The reflector 38 has an opening above and below the lamp 36, providing ventilation to the area surrounding the lamp 36, thereby preventing the lamp 36 from overheating and damaging surrounding components.

The honeycomb element 40, which is constructed of aluminum, collimates light into a beam that is generally non-divergent at distances over 500 feet. In one embodiment, the aluminum surfaces of the honeycomb element 40 are exposed and reflect light so that at closer ranges, such as under 300 feet, the element 40 tends to scatter light into a beam having an arc of divergence of approximately 160 degrees.

In another embodiment, the honeycomb element 40 is coated with a visible and infra-red light absorbing material, such as black paint. In this embodiment, the element 40 only collimates light into a beam which is generally non-divergent. It does not scatter light at closer ranges.

After light emitted by the lamp 36 passes through the honeycomb element 40, it passes through a lens 42. In one embodiment, the lens 42 is constructed of a material that is transparent to infra-red and visible light. The preferred material for such a lens is a clear polycarbonate plastic, such as Lexan TM 123, which is a product of the General Electric Company.

In another embodiment, the lens 42 is constructed of a material which is opaque to visible light, but is transparent to infra-red light. The preferred material for such a lens is an acrylic plastic formed with a visible light blocking dye, such as Material No. V811 with Color No. 58189, manufactured by Rohm-Hass. In this embodiment, an observer watching an operating optical emitter assembly 20, will not be able to perceive that the emitter is in operation. An optical emitter assembly having a lens 42 constructed of a material opaque to visible light and transparent to infra-red light will have a range that is approximately 25 to 50 percent less than the range of an optical emitter assembly having a lens 42 constructed of material which is transparent to visible and infra-red light.

Window 46 has the shape of a circle with the top and bottom of the circle truncated. In other embodiments, window 46 may assume other shapes, such as an oval or a rectangle. A gasket 44 is positioned between the lens 42 and front bezel 24 to seal and weather-proof the assembly. The gasket 44 has an opening similar in shape to that of the window 46 of the front bezel 24.

Figure 3:
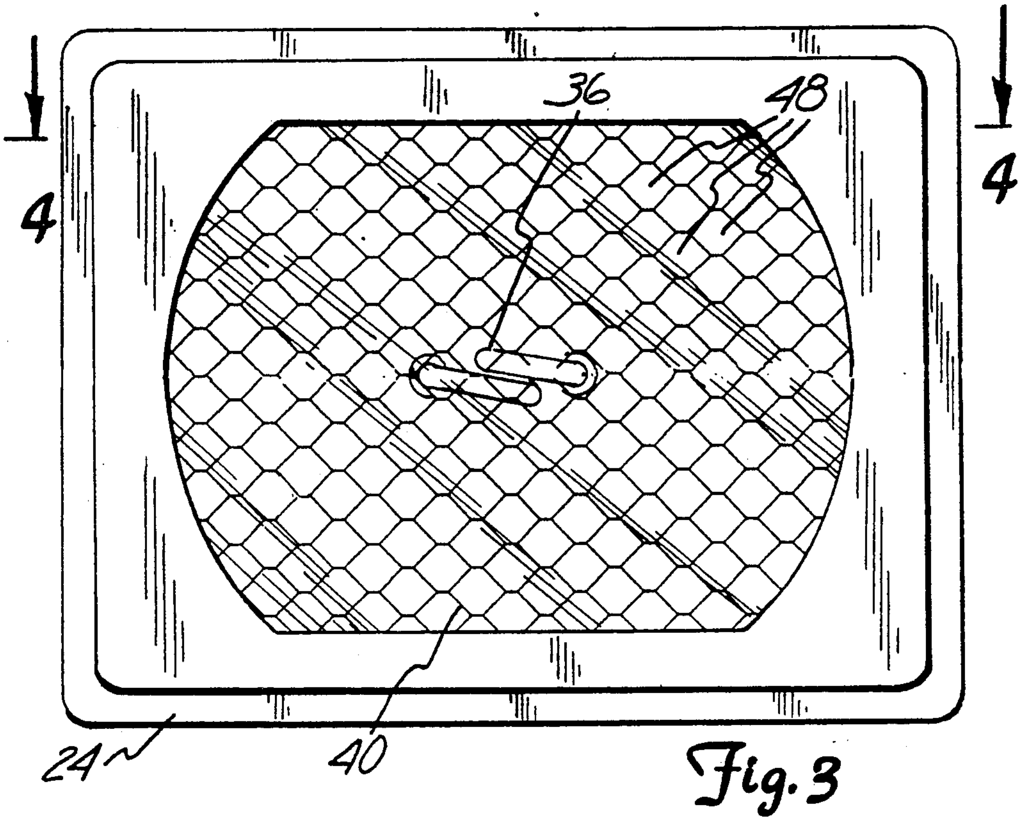
FIG. 3 is a front view of the optical emitter assembly of FIG. 2.

FIG. 3 is a front view of the optical emitter assembly 20 and shows that the honeycomb element 40 is constructed of a plurality of cells 48. Each cell has an opening which extends from the front through to the rear of the cell and has a generally hexagonal shape with two sides equal to a first length and four sides equal to a second length. The first length is approximately 0.125 inches and the second length is approximately 0.188 inches. The longest distance across the opening of a cell is approximately 0.25 inches. These dimensions give the cells a somewhat horizontally squashed appearance. The preferred honeycomb material is manufactured by Hexcel Corporation and is available under part number ACG-¼-4.8P.

Figure 4:
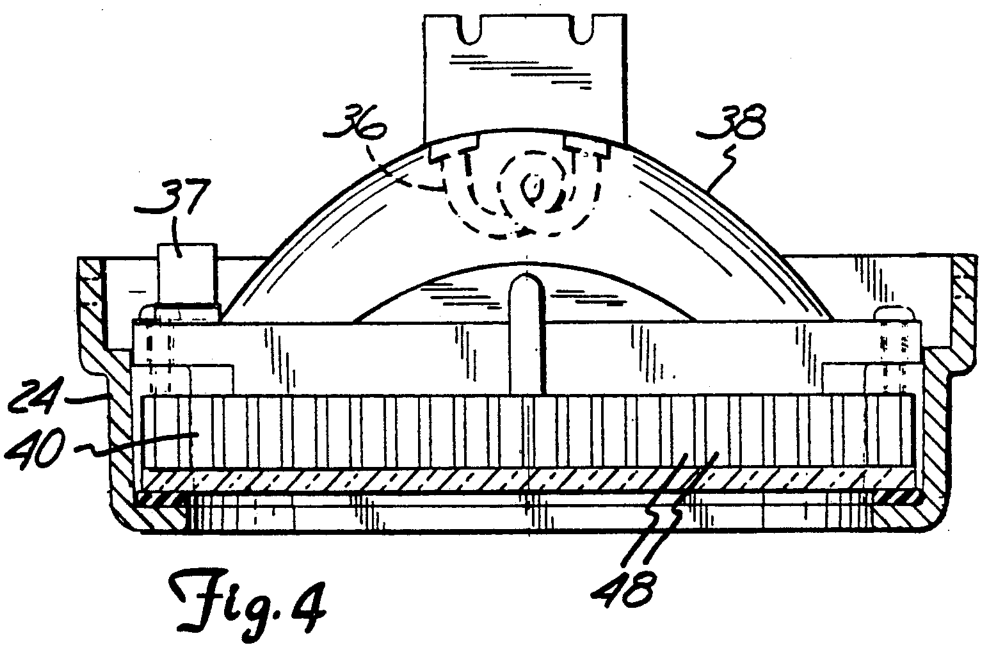
FIG. 4 is a sectional view taken along line 4—4 of FIG. 3 with portions thereof shown in full.

FIG. 4 is a sectional view taken along line 4—4 of FIG. 3 with portions thereof shown in full. FIG. 4 shows the orientation of the honeycomb element 40 with respect to the lamp 36. When the lamp 36 emits light pulses, light coming directly from the lamp 36 and light reflected by the reflector 38 passes through the honeycomb element 40. The honeycomb element 40 is approximately 0.375 inches thick and produces a light beam which is generally non-divergent at ranges greater than 500 feet.

In the embodiment where the honeycomb element 40 has reflective surfaces, the interior surfaces of the cells 48 will scatter light at closer distances, resulting in a light beam having an arc of divergence of 160 degrees at ranges less than 300 feet. In the embodiment where the honeycomb element 40 has surfaces which absorb visible and infra-red light, the light which passes through the honeycomb element 40 is only collimated by the cells 48 and is not scattered.

FIG. 4 also shows a pulse transformer 37, which produces a high voltage output signal and is part of the emitter power supply. The pulse transformer 37 is sensitive to heat and its high voltage output signal is difficult to transmit without causing electrical breakdown. For this reason, the pulse transformer 37 has been mounted to the front bezel 24. This location is cooler than a location on power supply board 32 and allows the high voltage output signal to be connected directly to lamp 36, thereby reducing the possibility of electrical breakdown.

Figure 5:
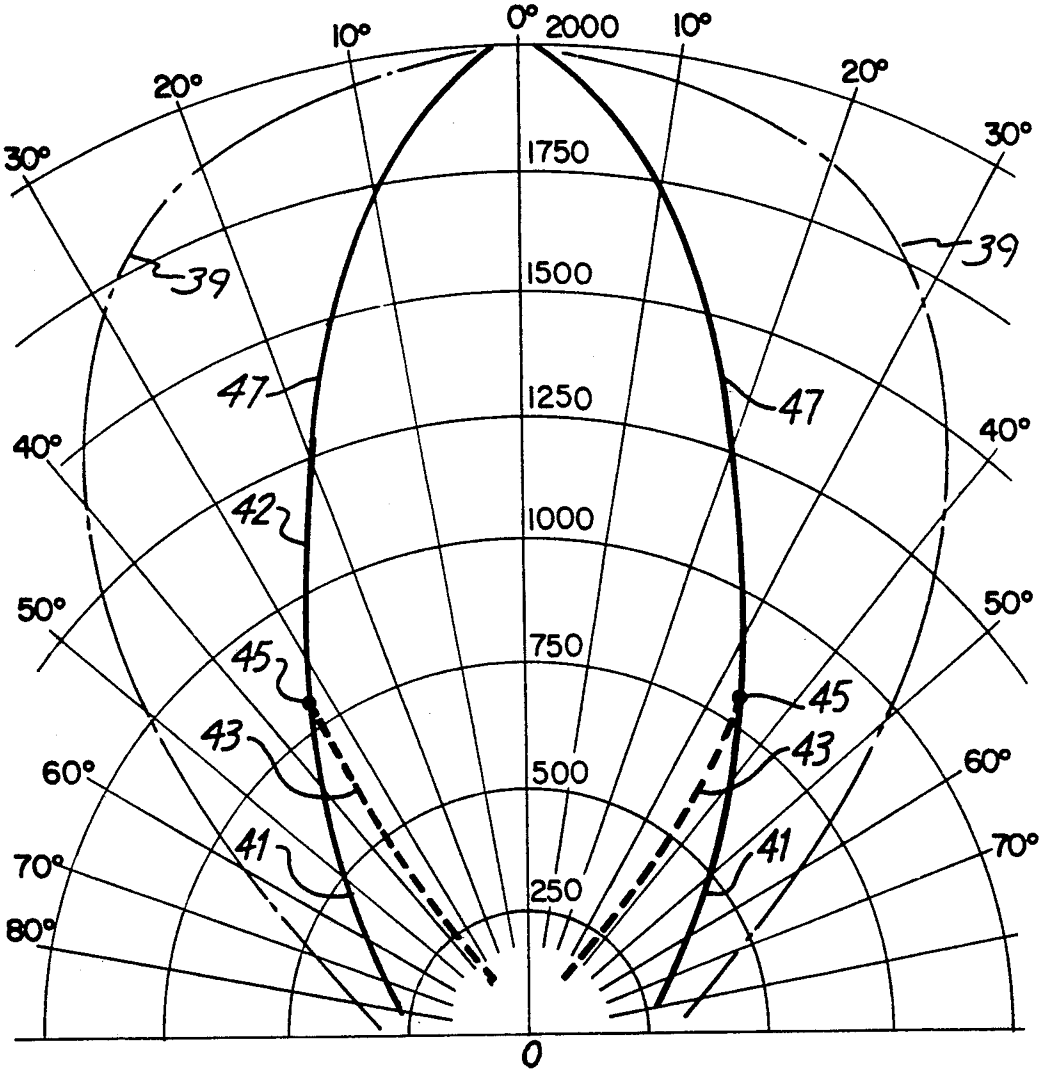
FIG. 5 is a diagram showing light beam dispersal patterns for an optical emitter of the prior art and two embodiments of the present invention.

FIG. 5 is a diagram showing typical light beam dispersal patterns for an optical emitter of the prior art and two embodiments of the present invention. An optical traffic preemption detector within an emitter's dispersal pattern will be activated if the emitter is transmitting a valid optical signal.

The range of an optical traffic preemption system is primarily dependent on the power of the optical emitter and the sensitivity of the detector. The dispersal patterns shown in FIG. 5 are based on emitter/detector combinations that have an effective range of approximately 2000 feet; a typical range for an optical traffic preemption system. The primary purpose of FIG. 5 is to show the dispersal patterns of the present invention and prior art emitters, not the ranges of emitter/detector combinations.

The line 39 represents a dispersal pattern for a typical optical emitter of the prior art. At a range of 1250 feet, the arc of divergence of the beam is greater than 60 degrees, which results in beam that is greater than 1500 feet wide at this range. Such a dispersal pattern is large enough to activate optical traffic preemption detector channels which are proximate to the traffic signals to be controlled, but are coupled to other traffic signal lights which are not to be controlled.

The lines 41, 43 and 47 represent the dispersal patterns of two of the embodiments of the present invention. The line 41 represents the embodiment where the honeycomb element 40 has reflective surfaces and scatters light, while the line 43 represents the embodiment where the honeycomb element 40 is coated with a material which absorbs visible and infra-red light. The point 45 is where the optical characteristics of the two embodiments converge. The two embodiments have similar optical characteristics in the region represented by the line 47.

At 1250 feet, both embodiments of the present invention have an arc of divergence of approximately 40 degrees, which results in a beam that is less than 850 feet wide at this range. Compared to optical emitters of the prior art, this narrow beam is much less likely to inadvertently activate an optical traffic preemption system detector channel which is proximate to the traffic signal lights to be controlled, but coupled to traffic signal lights which are not to be controlled.

Figure 6:
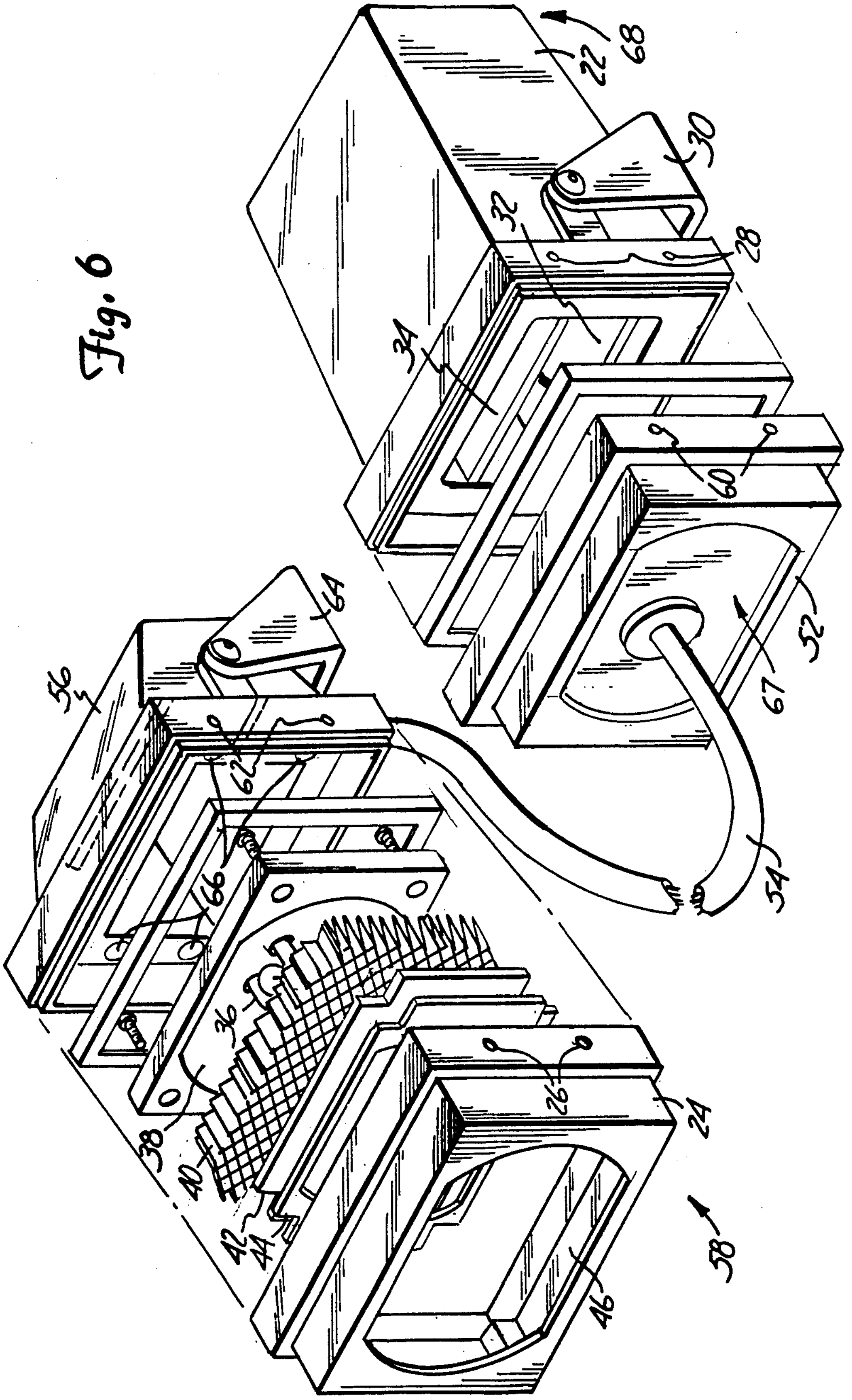
FIG. 6 is an exploded view of an alternate embodiment of the optical emitter assembly of the present invention configured with an optional kit that allows parts of the assembly to be mounted in two separate housings.

FIG. 6 is an exploded view of an alternative embodiment in which the optical emitter assembly 20 is configured with an optional kit that allows the power supply board 32 and the timing board 34 to be mounted independently from the lamp 36, the reflector 38, the honeycomb element 40 and the front bezel 24. This optional kit is comprised of a housing cover 52, a cable 54 and a front bezel base 56, a bracket spacer 67, a mounting bracket 64 and some additional fasteners.

To convert the stand-alone optical emitter assembly 20 of FIG. 2 into the two-part emitter assembly of FIG. 6, which has emitter module 58 and supply module 68, the reflector 38, the lamp 36, the honeycomb element 40, the lens 42, the gasket 44 and the front bezel 24 are removed from the housing 22. In place of the front bezel 24, the housing cover 52 is placed over the housing 22. The housing cover 52 is similar to the front bezel 24 and is joined with the housing 22 by inserting fasteners through the holes 60 to the threaded holes 28. A cable 54, which is secured to bracket spacer 67, couples the circuitry on the power supply board 32 and the timing board 34 to the lamp 36, which is housed in the front bezel base 56. The front bezel base 56 can be joined with the front bezel 24 by inserting fasteners through the holes 26 to the threaded holes 62. The emitter module 58 can be mounted on a vehicle by using the bracket 64.

Figure 7:
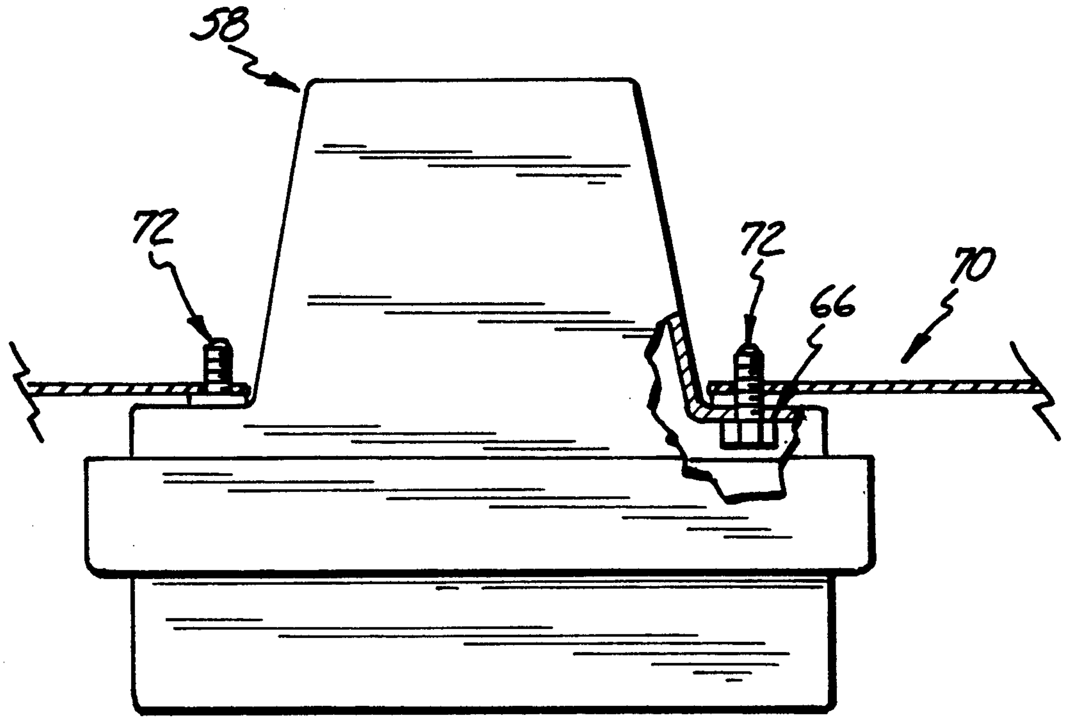
FIG. 7 is a sectional view of a vehicle body showing an emitter module mounted through the vehicle body.

Emitter module 58 can also be mounted to an opening of a vehicle body, as shown in FIG. 7 where emitter module 58 is mounted to a body 70 of a vehicle. In this mounting configuration, knock-out holes 66 (also shown in FIG. 6) are opened so that fasteners 72 can attach the emitter assembly 58 to body 70. The supply module 68 can be mounted in a convenient location and connected to the emitter module 58 with cable 54.

Although the present invention has been described with reference to preferred embodiments, workers skilled in the art will recognize that changes may be made in form and detail without departing from the spirit and scope of the invention.

What is claimed is:

1. An optical signal emitter assembly for remotely controlling traffic signal lights and adapted to be affixed to an authorized vehicle, the optical emitter assembly comprising:

a housing;

a light source for converting a supply voltage into a power signal capable of activating the light source;

timing means coupled to the power supply and the light source, for controlling the repetition rate and duration of light pulses; and collimating means including a honeycomb element having a plurality of cells, with each cell having an opening that extends form a front through to a rear of the cell, said element being positioned in front of the light source, for collimating the light pulses emitted by the light source thereby resulting in a pulsed light beam capable of activating a first photodetector channel coupled to the traffic signal lights to be controlled, while not activating other photodetector channels proximate to the first photodetector channel, but coupled to other traffic signal lights which are not to be controlled.

2. The optical signal emitter assembly of claim 1 and further comprising a lens positioned in front of the collimating means.

3. The optical signal emitter assembly of claim 2 wherein the lens is formed from a material that is transparent to visible and infra-red light.

4. The optical signal emitter assembly of claim 2 wherein the lens is formed from a material that is opaque to visible light and transparent to infra-red light.

5. The optical signal emitter assembly of claim 1 wherein a longest distance across the opening of a cell is approximately 0.25 inches and a distance between the front and the rear of a cell is approximately 0.375 inches.

6. The optical signal emitter assembly of claim 5 wherein the pulsed light beam is generally non-divergent at distances greater that 500 feet from the optical signal emitter assembly.

7. The optical signal emitter assembly of claim 1 wherein the honeycomb element is formed from aluminum.

8. The optical signal emitter assembly of claim 1 wherein surfaces of the honeycomb element are formed from a material which absorbs visible and infra-red light.

9. The optical signal emitter assembly of claim 1 wherein surfaces of the honeycomb element are formed form a material which reflects visible and infra-red light, thereby scattering the light and resulting in the pulsed light beam having an arc of divergence of approximately 160 degrees at distances less than 300 feet from the optical signal emitter assembly.

10. The optical signal emitter assembly of claim 1 and further comprising a window positioned in front of the collimating means, the window having the shape of a circle with the top and bottom of the circle truncated.

11. An optical signal emitter assembly for remotely controlling traffic signal lights and adapted to be affixed to an authorized vehicle, the optical emitter assembly comprising:

a housing having first joining means;

a front bezel having second joining means, wherein the second joining means is adapted to be joined with the first joining means;

electrical connection means for connecting components in the housing with components in the front bezel;

a light source positioned in the front bezel, for emitting light pulses;

a power supply for converting a supply voltage into a power signal capable of activating the light source;

timing means coupled to the power supply and the light source, for controlling the repetition rate and duration of light pulses; and collimating means including a honeycomb element having a plurality of cells, with each cell having an opening that extends from a front through to a rear of the cell, said element being positioned in the front bezel and in front of the light source, for collimating the light pulses emitted by the light source thereby resulting in a pulsed light beam capable of activating a first photodetector channel coupled to the traffic signal lights to be controlled, while not activating other photodetector channels proximate to the first photodetector channel, but coupled to other traffic signal lights which are not to be controlled.

12. The optical signal emitter assembly of claim 11 wherein the power supply is positioned in the housing.

13. The optical signal emitter assembly of claim 11 wherein heat sensitive components of the power supply are positioned in the front bezel, and a remainder of power supply components are positioned in the housing.

14. The optical signal emitter assembly of claim 11 wherein the timing means is positioned in the housing.

15. The optical signal emitter assembly of claim 11 and further comprising a lens positioned in front of the collimating means.

16. The optical signal emitter assembly of claim 11 and further comprising mounting means coupled to the housing, for mounting the housing to a vehicle.

17. The optical signal emitter assembly of claim 11 wherein the first joining means is joined with the second joining means.

18. The optical signal emitter assembly of claim 11 and further comprising:

conversion means for allowing the housing to be mounted separately from the front bezel, the conversion means comprising:

a housing cover having third joining means, wherein the third joining means is joined with the first joining means; and a front bezel base having fourth joining means, wherein the second joining means is joined with the fourth joining means.

19. The optical signal emitter assembly of claim 18 wherein the bracket spacer has a hole through which the electrical connection means passes.

20. The optical signal emitter assembly of claim 18 wherein the front bezel is located on an exterior of a vehicle, the housing is located at another location of the vehicle and the connection means is of sufficient length to connect the housing to the front bezel.

21. The optical signal emitter assembly of c)aim 18 and further comprising mounting means coupled to the front bezel base, for mounting the front bezel base to a vehicle.

* * * * *